Oct. 2, 1945.    L. A. HAYES    2,386,114
TOY BLOCKS AND CONTAINER
Filed April 14, 1944    2 Sheets-Sheet 1
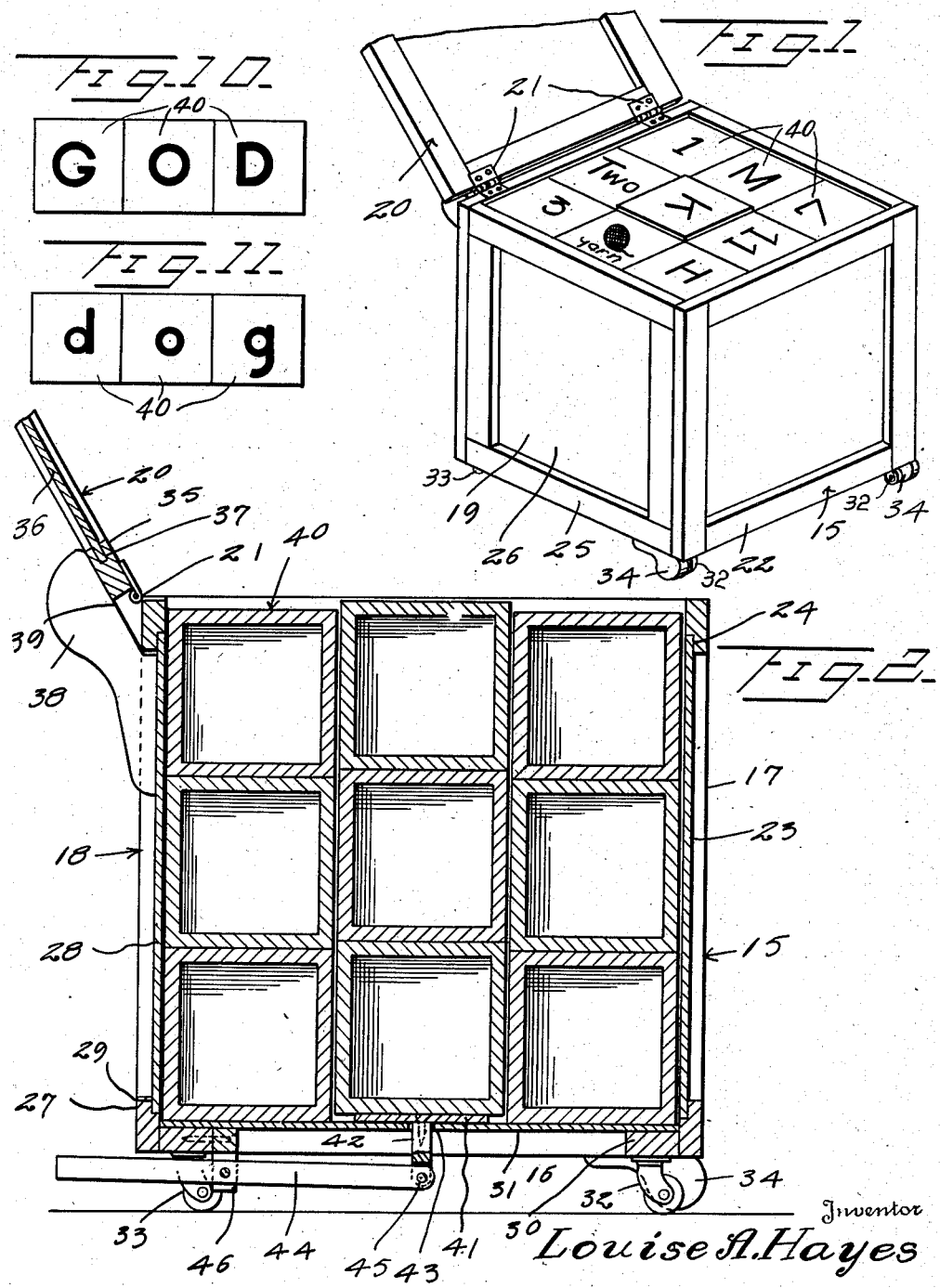

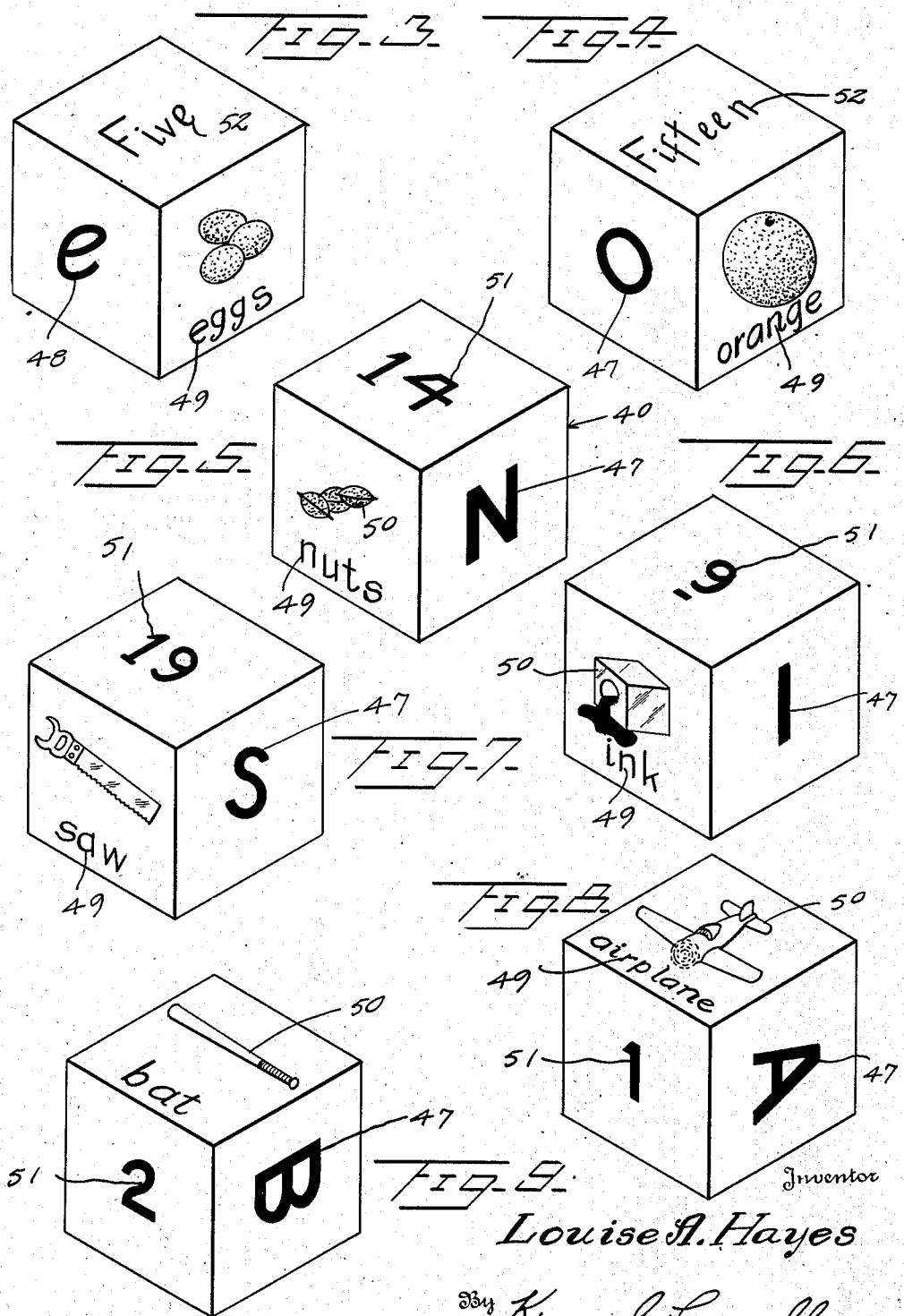

Patented Oct. 2, 1945

2,386,114

UNITED STATES PATENT OFFICE 2,386,114

TOY BLOCKS AND CONTAINER

Louise A. Hayes, Washington, D. C.

Application April 14, 1944, Serial No. 531,081

2 Claims. (Cl. 35—69)

This invention relates to toys and more particularly to toy blocks and a holder therefor.

An object of this invention is to provide in combination a plurality of hollow cube-like blocks and a holder therefor, the holder being of a size to hold the blocks in layers and the holder including an ejector for raising the centermost blocks so that the blocks of each layer may be readily withdrawn.

Another object of this invention is to provide a series of educational blocks bearing upper and lower case alphabetical characters on two sides thereof, a word beginning with the particular character and a picture representing an object designated by the word, a numeral on another side with the numeral written out as a word on a further side, and any suitable indication on the sixth side of the block. The arrangement of the characters on the blocks is such that for quite a few words the upper case characters will spell out one word, whereas the lower case characters, which will read backwards from the upper case characters, will spell out another word.

A further object of this invention is to provide an improved holder embodying a square receptacle or container, a hinged lid therefor, a bracket for holding the lid in open position, and a plunger in the bottom of the receptacle for elevating at least one of the blocks in the receptacle so that the blocks of each layer can be removed.

Among the further objects of this invention are those of providing a set of educational and play blocks together with a container for the blocks by virtue of which a child may be aided in obtaining muscular development and control; may have rich experiences of an educational and training value through what appears to the child as being merely play; through which the curiosity of the child may be fostered and a desire created to explore new materials; through which the child may be trained in conversation through oral expression of his ideas; through which the child may be taught to recognize and learn primary and secondary colors; and through which the child can learn to associate pictures with the written symbols and interpret the ideas and meanings conveyed.

The blocks herein provided are so comprised as to colors, characters, and numerals thereon as to afford simple tests and comparisons for determinative uses in the fields of education and psychiatry.

In the drawings:

Figure 1 is a perspective view partly broken away of a toy constructed according to an embodiment of this invention;

Figure 2 is a vertical section partly broken away of the device;

Figures 3 to 9 are perspective views showing some of the blocks used for this device;

Figure 10 is a detail side elevation of several of the blocks showing the upper case characters on one side thereof formed into a word; and Figure 11 is a detail side elevation of the opposite sides of the blocks arranged in Figure 10 showing lower case characters forming an additional word.

Referring to the drawings, the numeral 15 designates a container or receptacle which is formed of a bottom wall 16, front and rear walls 17 and 18, respectively, and opposite side walls 19. A lid or top wall 20 is hingedly secured as at 21 to the upper edge of the rear wall 18 and in operative position is adapted to overlie the upper edges of the front, rear, and opposite side walls. The front wall 17 includes a rectangular frame 22 having a panel 23 secured in a rabbeted inner portion 24. The side walls 19 are also formed of a rectangular frame 25 having a panel 26 secured in the rabbeted inner portion thereof similar to the rabbet 24. The rear wall 18 is also constructed in the form of a rectangular frame 27 having a panel 28 secured in the rabbeted inner portion 29 thereof. The bottom wall 16 includes a rectangular bottom frame 30 having secured to the upper side thereof a bottom panel 31.

The container 15 is provided with casters 32 at the opposite sides of the front thereof, and is also provided with one or more rear casters 33. A pair of downwardly extending legs or blocks 34 are secured to the opposite sides of the container 15 at the front thereof and substantially conceal the front casters 32. In practice, the legs 34 are arranged so that they will not touch the floor so that the container can be readily shifted about the floor on the casters. The lid or closure 20 includes a rectangular frame 34 having a top panel 36 secured in a groove 37 formed in the frame 35. The lid or cover 20 is adapted to be held in open position, in which position the lid is upwardly and rearwardly inclined, by means of a pair of brackets 38 which are secured to the rear wall 18. The brackets 38 are formed with upwardly and rearwardly inclined forward faces 39 against which the lid 20 is adapted to bear when the latter is in open position, as shown in Figure 2.

A plurality of hollow cubical blocks generally designated as 40 are adapted to be positioned within the container 15, the container 15 being of such size that in the present instance nine of these blocks may be arranged in each layer and there are three layers of these blocks within the container which will substantially fill the latter. In order to provide a means whereby the blocks in the container may be readily removed therefrom in successive layers, I have provided a plunger or ejector 41 which in normal position is adapted to engage on the upper side of the bottom panel 31, as shown in Figure 2. The ejector 41 engages beneath the central column of blocks and is provided with a stem 42 slidably engaging through an opening 43 formed in the bottom panel 31. An operating lever 44 is pivotally connected as at 45 to the lower end of the stem 42 and is pivotally mounted intermediate the ends thereof in a supporting block 46 which is secured to the frame 20. The operating lever 44 projects rearwardly of the rear wall 18 and is adapted to be engaged by foot so as to raise the forward end of the lever 44 and thereby raise the central column of blocks 40 within the container. The uppermost of these blocks may then be raised from the uppermost layer, and the other blocks in this upper layer may then be removed and the blocks in the succeeding layers may be removed in like manner. The plunger 41 is gravitatingly moved to a lower inoperative position.

The blocks 40 are provided with different characters, numerals, and figures or designs, including descriptive words of the designs on the various faces thereof. As shown in Figure 5, on one face of the blocks there is provided an upper case character 47. On the opposite face of the block 40 there is provided a lower case character 48, and it will be understood that the entire surface of each block may be colored by painting, dyeing, or other suitable means, and the blocks colored in varying colors as may be desired. The characters 47 and 48 are alphabetical characters, and on an adjacent face of each block there is provided a word 49 which is descriptive of the character 47. The word 49 in the present instance is "nuts," in Figure 5, and a picture 50 of one or more nuts is painted or imprinted on the face of the blocks 40 bearing the descriptive word 49.

A further side of each block 40 may be provided with a numeral 51 which in the present instance is numeral 14 in Figure 5, indicating the fourteenth alphabetical character "N." On the opposite side of the block 40 from the numeral 51 there is a word as indicated in Figure 3 at 52, the word being the numeral written out. On the side of the block opposite from the descriptive word 49 there may be any suitable pleasing characters of an instructive nature. By providing these blocks with an upper case character 47 on one face thereof and a lower case character on the opposite face thereof when the blocks are arranged to form a word with the upper case characters, in numerous instances the lower case characters 48 will form an additional word reading reversely from the word formed by the upper case characters 47. By providing a short word on an adjacent face or side of each block made up from the alphabetical character of the particular block, a child will be impressed with the particular alphabetical character. In like manner by providing a numeral on one side of each block and having the numeral written as a word on the opposite side of the block, the child will also have the numeral and the word more thoroughly impressed on his mind. As an example of arranging the blocks 40 to form a short word, reference is had to Figure 10 where the blocks are arranged to form a three character word with the upper case characters 47, and on the opposite faces of these blocks there will be formed another word from the lower case characters.

These blocks are preferably made hollow so that they may be made fairly large and will at the same time be light weight so that they may be readily handled by a child. In practice, the blocks are made from a cypress wood which will form strong blocks and several sides of the blocks may be glued or otherwise firmly fastened together.

In the use of this device when the container 15 is entirely filled with blocks as shown in Figure 2, the lid may be raised to permit removal of selected ones or all of the blocks. In order to facilitate removal of the blocks, the operator or lever 44 is depressed by foot at the rear end of the lever thereby raising the central column of blocks so that the central uppermost blocks may be easily removed. The other blocks in the same layer may be removed by sliding the intermediate blocks into the empty space formed by removal of the central block. After the upper layer of blocks has been removed, the intermediate or central layer may be removed in like manner and the same operation is performed by removing the lower layer. The container 15 is made fairly large so that it may be used as a seat or for other purposes.

What is claimed is:

1. In a toy comprising a receptacle, a plurality of blocks disposed in layers and columns in said receptacle, a block-ejecting plate normally resting on the bottom of said receptacle and engaging a column of said blocks from beneath, a stem secured to said plate and slidably extending downwardly through the receptacle bottom, a rock lever pivotally secured at one end to said stem and extending beyond the receptacle, and means pivotally supporting said lever intermediate the ends thereof whereby downward pressure upon said lever will raise a column of said blocks engaged by said plate above the level of the blocks in the respective layers to enable the uppermost block of said column to be grasped and removed from the receptacle.

2. In a toy comprising a receptacle, a plurality of blocks disposed in layers and columns in said receptacle, a centrally disposed block-ejecting plate normally resting on the bottom of said receptacle and engaging a central column of said blocks from beneath, a stem secured to said plate and slidably extending downwardly through the receptacle bottom, a rock lever pivotally secured at one end to said stem and extending beyond the receptacle, and means pivotally supporting said lever intermediate the ends thereof whereby downward pressure upon said lever will raise said central column of said blocks engaged by said plate above the level of the block in the respective layers to enable the uppermost block of said central column to be grasped and removed from the receptacle.

LOUISE A. HAYES.